Dec. 15, 1953     J. B. BRENNAN     2,662,928

STORAGE BATTERY ELECTRODE

Filed Feb. 25, 1950

INVENTOR.
JOSEPH B. BRENNAN
BY Hudson, Boughton,
Williams, David & Hoffmann
ATTORNEYS Patented Dec. 15, 1953

2,662,928

UNITED STATES PATENT OFFICE 2,662,928

STORAGE BATTERY ELECTRODE

Joseph B. Brennan, Cleveland, Ohio

Application February 25, 1950, Serial No. 146,237

8 Claims. (Cl. 136—24)

This invention relates to an electrode for electrolytic devices, such as for storage batteries.

Insofar as common subject matter is concerned, this application is a continuation in part of my application Serial No. 591,909, filed May 4, 1945, and now abandoned.

An object of this invention is to provide a more stable porous metal electrode for use in storage batteries, and the description is particularly directed herein to a negative composite electrode for an alkaline cell.

According to this invention the negative electrode comprises at least two layers of porous metal—one layer of metal being superimposed on another layer of porous metal, whereby the generally less stable and more active porous metal layer functions electrolytically thru a membrane comprised of a particulate bonded layer of more stable porous metal.

According to this invention a layer of for example zinc, cadmium or iron, or silver, is first made into a conductive coherent, preferably thin porous layer, as for example by spray depositing molten particles thereof in strip form, preferably continuously as described in the above mentioned pending applications.

If desired, porous metallic conductive strip may be made by sintering any thin strip or wire form. Parallel metallic filaments and/or fibrous cords or strands may be included in the molten particulate metal layer if desired, according to this invention. This is accomplished by using the parallel strands of metal and/or fibrous cords as a base upon which the particulate molten metal is spray deposited on one or both sides.

After a first porous metallic strip has been made, it may be pasted or electroformed with active material, which is generally an oxide of the molten particulate metal of which this strip is composed. Such first strip, according to this invention, is made of, for example, spray deposited zinc, cadmium or iron, or silver, for use in an alkaline cell. Thereafter this first strip of porous metal may be slit or perforated to increase the porosity thereof, or may be used with the normally secured porosity as described in the above applications.

The next operation in carrying out my invention is to spray deposit a molten layer of nickel which is porous, over the initially deposited porous first strip metal layer, so as to form an enclosure therearound which will act as a fine porous filter membrane. Such enclosure will retain the active materials in the location in which they are initially formed or placed. This may be accomplished by first continuously spray depositing both sides of the strip of for example, the initial zinc spray deposited strip with nickel while running same or passing same over a fluid cooled, highly polished non-adherent roll. Thereafter the composite strip may be cut into suitable lengths and have the ends spray deposited with nickel where cut, so that a continuous envelope of porous sprayed deposited nickel extends over the entire body of the porous zinc inner spray deposited layer.

It is also desirable, for certain applications, to have an outer layer of finely perforated metal to act as a support for the multiple spray deposited layer which can be applied after the inner composite spray deposited layers are made by welding finely perforated sheet metal thereover and therearound to render the electrode structure more rugged. If preferred, the perforated sheet metal may be used as a base for spraying deposited nickel in thin layer form thereover, and thereafter spray depositing a layer of for example, zinc or cadmium or iron, or a mixture of zinc and cadmium, upon one side of said perforated strip metal, and thereafter taking two cut-out pieces of a so constituted composite layer and placing them in face to face relation, with the most negative of the metals adjacent, and line welding these composite strips together to form a unitary electrode. In either example given the zinc or cadmium, or iron, or silver will be interior to and enclosed by the nickel porous envelope.

Referring to the drawings herewith:

Figure 1:
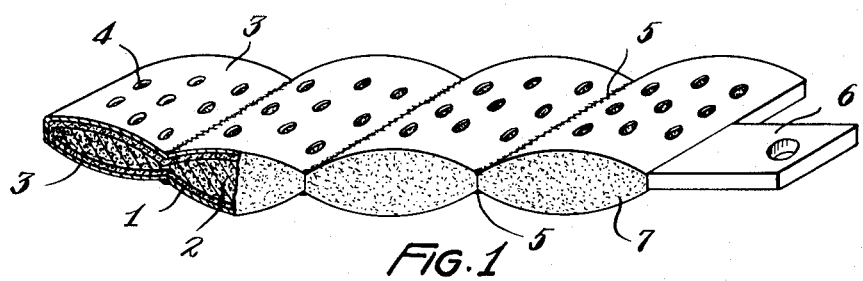
Fig. 1 is a perspective view showing an electrode embodying the present invention, the electrode being shown mainly in elevation but with portions thereof in section.

Figure 1 represents a composite negative electrode wherein 2 Fig. 1 is a body or layer of spray deposited zinc having zinc active material included therein due to electro-formation or pasting, and 1 Fig. 1 represents a porous molten spray deposited conductive coherent layer of nickel thereover. 3 Fig. 1 represents a perforate sheet metal enclosure, and 4 Fig. 1 the perforations in said sheet metal enclosure. 5 Fig. 1 represents line welding whereby the layers of exterior sheet metal are joined together, and 6 Fig. 1 represents a nickel enclosed terminal member.

Figure 2:
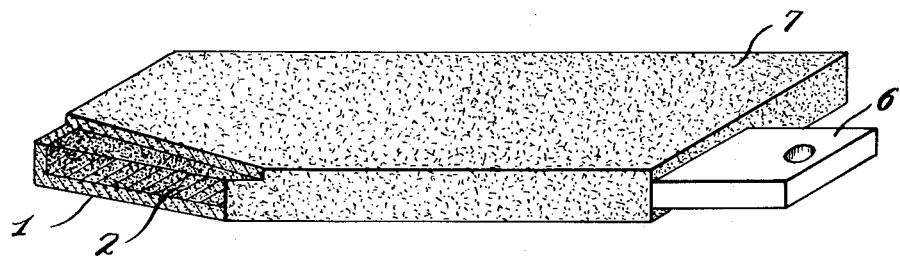
Fig. 2 is a perspective view similar to that of Fig. 1 but showing an electrode of a somewhat different form of construction.

Figure 2 of the drawings represents such an electrode without the sheet metal enclosure. 2 Fig. 2 represents the inner layer of molten zinc spray deposited in fine metallic form having active material included therein, and 1 Fig. 2 represents the sheath or envelope of molten nickel which has been spray deposited thereover. 6 Fig. 2 represents a like terminal to that shown in Figure 1.

Figure 3:
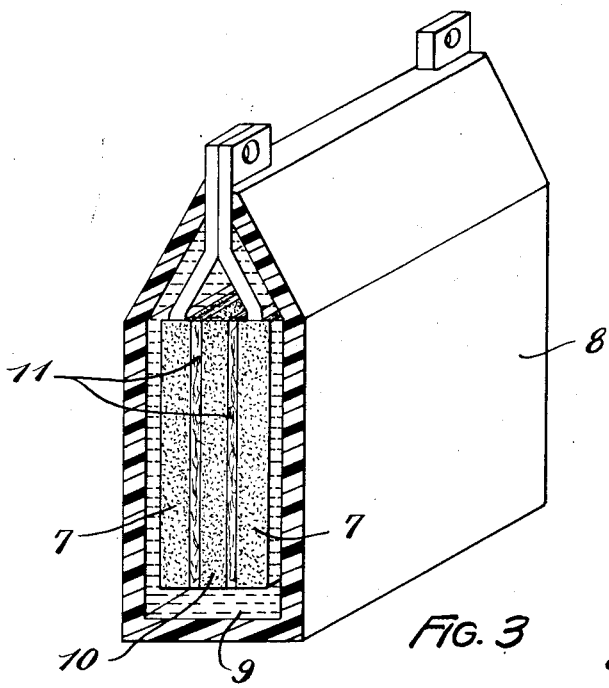
Fig. 3 is a perspective view showing a storage battery utilizing electrodes of the present invention, the battery being shown partially in elevation and partially in vertical section.

Figure 3 represents a series of three electrodes assembled in a, for example, plastic polystyrene bag, 8 Fig. 3, which is sealed completely around these three electrodes and contains suitable electrolyte, 9 Fig. 3, such as a zincate solution, when the composite electrodes, 7 Fig. 3, are of particulate zinc enclosed in porous spray deposited nickel. 10 Fig. 3 represents a preferably porous nickel electrode impregnated or electroformed with cadmium hydroxide, and 11 Fig. 3 represents suitable porous spacers of non-conductive material between these three electrodes.

The principal advantage of this invention resides in the retardation of treeing, which is generally present in an alkaline cell where for example, zinc electrodes are used in conjunction with nickel electrodes.

It is also to be understood according to this invention that a mixture of zinc and cadmium molten spray deposited particulate metal may be used in the inner portion of each electrode to promote stability in this inner portion.

Electrodes for other electrolytic devices may be advantageously made in two or more porous particulate layer form. For example, an aluminum porous electrode may be enclosed in an envelope of porous tantalum for an electrolytic condenser, and a porous magnesium electrode may be enclosed in a porous envelope of aluminum to promote stability and to retard disintegration. The exterior porous particulate metallic membrane of the more stable metal acts as an anticorrosion and a stabilizing shield.

The amount of capacity in each electrode can be increased advantageously by successively spray depositing a number of metallic layers one upon the other, i. e. for example three successive layers of zinc may be spray deposited, and then several layers of nickel thereover. This will give greater capacity for the amount of metal used than a single thicker layer of zinc and a single thicker layer of porous nickel thereover.

It is also contemplated according to this invention to simultaneously spray deposit exteriorly molten particulate metal of widely different particle size so as to form a coarser spray deposited grid by means of exteriorly molten large particles greater than say 10 microns, and filling in this coarser grid by spraying exteriorly molten particles of 1½ to 10 microns diameter therewith.

In any case according to this invention a single composite electrode comprises at least two layers of porous conductive coherent particulate metal in facial conductive relationship so that the major portion of the active material ions must migrate through a fine particulate layer of more inert metal, such as nickel, which is more rugged and stable in the electrolyte encountered in the electrolytic cell in which it is used.

Having described my invention, I claim:

1. A composite porous metallic negative electrode for storage batteries of the alkaline electrolyte type comprising an inner layer of relatively highly electrolytically active negative porous particulate spray deposited metal enveloped by and thermally and conductively bonded to an exterior relatively less active porous spray deposited particulate nickel layer, said nickel layer imparting the characteristics of stability and durability to said electrode by rendering the same resistant to corrosion and disintegration.

2. A composite porous metallic electrode for storage batteries comprising an inner layer of electrolytically more active porous particulate coherent metal enveloped by and thermally and conductively bonded to an exterior porous, less active permeable coherent layer of particulate metal, said exterior layer imparting the characteristics of stability and durability to said electrode by rendering the same resistant to corrosion and disintegration.

3. A composite porous metallic negative electrode for storage batteries of the alkaline electrolyte type comprising an inner layer of relatively highly electrolytically active negative porous particulate spray deposited metal enveloped by and thermally and conductively bonded to an exterior relatively less active porous layer of particulate spray deposited nickel, said outer layer comprising a deposit of particles of a size generally greater than 10 microns in diameter forming a grid-like surface characteristic and a deposit of particles of a size generally less than 10 microns in diameter as a filling for said grid-like surface characteristic.

4. A composite porous metallic electrode for storage batteries of the alkaline electrolyte type comprising a relatively highly electrolytically active inner body of porous molten spray deposited particulate cadmium enveloped by and thermally and conductively bonded to an exterior relatively less active porous layer of spray deposited particulate nickel, such exterior layer imparting the characteristics of stability and durability to said electrode by rendering the same resistant to corrosion and disintegration.

5. A composite porous metallic electrode for storage batteries as defined in claim 4 in which the molten spray deposited particulate metal of said relatively highly electrolytically active inner body is iron.

6. A composite porous metallic electrode for storage batteries as defined in claim 4 in which the molten spray deposited particulate metal of said relatively highly electrolytically active inner body is zinc.

7. A composite porous metallic electrode for storage batteries as defined in claim 4 in which the molten spray deposited particulate metal of said relatively highly electrolytically active inner body is silver.

8. A composite porous metallic electrode for storage batteries of the alkaline electrolyte type comprising a relatively highly electrolytically active inner body of porous molten spray deposited particulate metal enveloped by and thermally and conductively bonded to an exterior relatively less active porous layer of spray deposited particulate nickel; the particulate metal of said inner body being one selected from the group which consists of cadmium, iron, zinc and silver; such exterior layer imparting the characteristics of stability and durability to said electrode by rendering the same resistant to corrosion and disintegration.

JOSEPH B. BRENNAN.

References Cited in the file of this patent

UNITED STATES PATENTS

| Number | Name | Date |
|---|---|---|
| 439,416 | Morrison et al. | Oct. 28, 1890 |
| 444,969 | Bain | Jan. 20, 1891 |
| 850,788 | Roselle | Apr. 16, 1907 |
| 871,214 | Edison | Nov. 19, 1907 |
| 969,387 | Michael | Sept. 6, 1910 |
| 2,304,073 | Brennan | Dec. 8, 1942 |
| 2,361,378 | Brennan | Oct. 31, 1944 |

FOREIGN PATENTS

| Number | Country | Date |
|---|---|---|
| 89,926 | Austria | Nov. 10, 1922 |